Figures 1, 5:
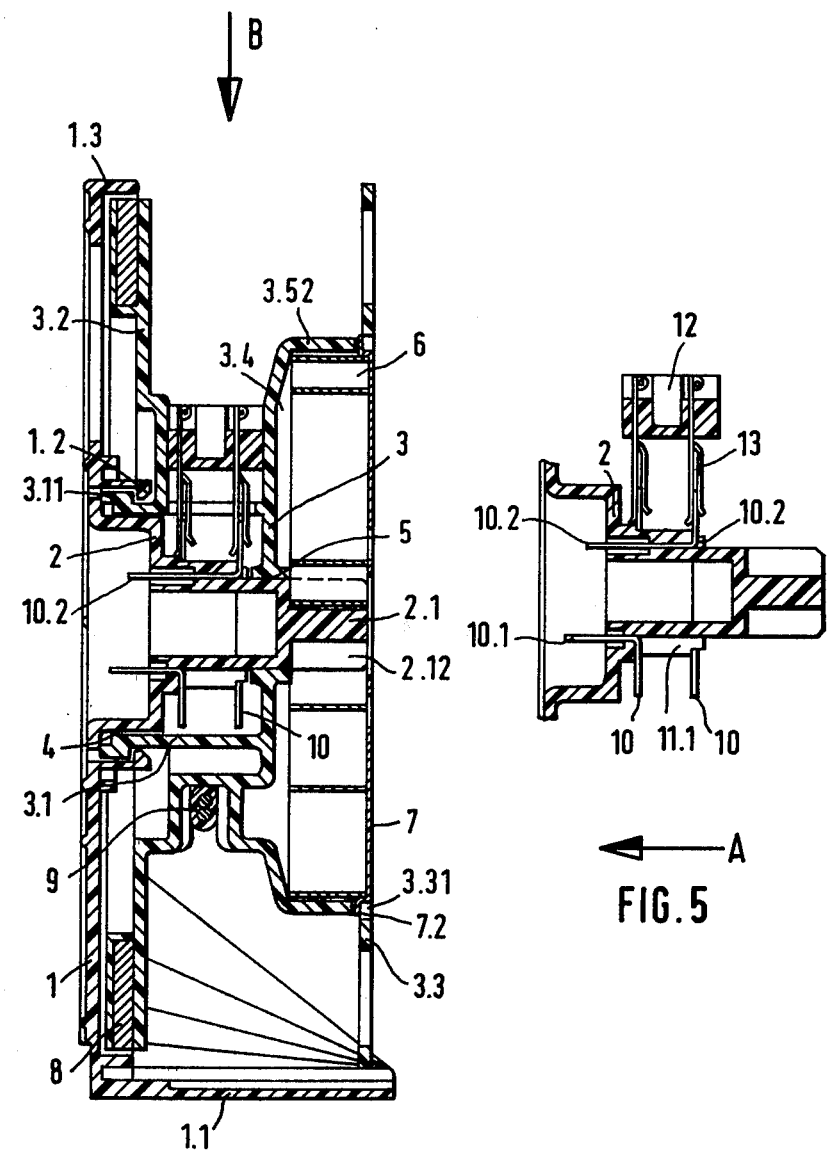

United States Patent [19]

Schaller et al.

[11] Patent Number: 4,485,278
[45] Date of Patent: Nov. 27, 1984

[54] DEVICE FOR AUTOMATICALLY WINDING UP A FEEDER CABLE

[76] Inventors: Albert R. Schaller, Rilkeweg 1, 7573 Sinzheim; Werner Vetter, Peterswiesenweg 5, 7130 Mühlacker 7; Dieter J. Steiner, Mohrenstrasse 3, 7501 Marxzell 1, all of Fed. Rep. of Germany

[21] Appl. No.: 395,058
[22] PCT Filed: Jan. 2, 1981
[86] PCT No.: PCT/DE81/00001
    § 371 Date: Jun. 18, 1982
    § 102(e) Date: Jun. 18, 1982
[87] PCT Pub. No.: WO82/01623
    PCT Pub. Date: May 13, 1982

[30] Foreign Application Priority Data

Oct. 29, 1980 [DE] Fed. Rep. of Germany ....... 3040664

[51] Int. Cl.³ .................. H02G 11/02; B65H 75/30
[52] U.S. Cl. .................. 191/12.4; 242/107.3; 339/5 RL; 339/8 RL
[58] Field of Search .................. 191/12.2 R, 12.4; 242/107, 107.3; 339/5 R, 5 A, 5 M, 5 RL, 6 R, 6 A, 6 RL, 8 R, 8 A, 8 RL

[56] References Cited

U.S. PATENT DOCUMENTS

| | | | |
|---|---|---|---|
| 2,926,865 | 3/1960 | Humphreys | 191/12.2 R |
| 3,110,453 | 11/1963 | Becker et al. | 191/12.2 R X |
| 3,346,705 | 10/1967 | Slinkard et al. | 191/12.4 |
| 3,374,319 | 3/1968 | Stahmer | 191/12.2 R |
| 3,587,474 | 6/1971 | Fuchs | 242/107.3 X |
| 3,589,632 | 6/1971 | Rew | 242/107.3 X |
| 3,617,659 | 11/1971 | Freeman | 191/12.2 R |
| 3,657,491 | 4/1972 | Ryder et al. | 191/12.2 R |
| 3,874,489 | 4/1975 | Christensen | 191/12.2 R |
| 4,061,290 | 12/1977 | Harrill | 191/12.2 R X |

FOREIGN PATENT DOCUMENTS

| | | |
|---|---|---|
| 1574391 | 8/1971 | Fed. Rep. of Germany . |
| 2620924 | 11/1977 | Fed. Rep. of Germany . |
| 2756023 | 6/1979 | Fed. Rep. of Germany . |
| 1464060 | 12/1966 | France . |
| 2452458 | 10/1980 | France . |
| 1532997 | 11/1978 | United Kingdom . |

Primary Examiner—Robert B. Reeves
Assistant Examiner—David F. Hubbuch
Attorney, Agent, or Firm—Andrus, Sceales, Starke & Sawall

[57] ABSTRACT

In a device for automatically winding up an electrical cable for an electrically operating apparatus on a drum, the drum is journalled with its hollow hub in two sleeve bearings of different diameter formed with a pivot spindle fixed on a base plate. Between the bearings two sliding contact elements comprised of contact rings and contact springs are arranged, of which the contact rings are arranged non-rotatably on the pivot spindle, and the contact springs are arranged in a contact carrier insertable in a recess in the hub. The opening of the hollow drum hub (3.1) facing the base plate (1) is provided with a collar (3.11) and locking pawls (1.2) are provided on the base plate (1) that engage behind the collar (3.11) of the hub (3.1) so that the drum (3) is secured against axial drawing off of the pivot spindle (2). The contact carrier (12) is insertable in a radial direction in the recess (3.12) of the hub (3.1) and is held therein through a locking connection. The contact springs (13, 21) are so arranged or formed, that the contact pressures are effective only in the contact elements and are not transferred to the sleeve bearings (4, 5). To that end, the contact springs (21) can be bent in a U-form with legs (21.1, 21.2) contacting with the contact rings (20) on their diametrically oppositely lying outer surfaces or can be formed comblike with prongs (13.1) contacting the contact rings (10) on both surfaces. Centrifugal brake weights (8) are provided on a drum flange.

10 Claims, 11 Drawing Figures

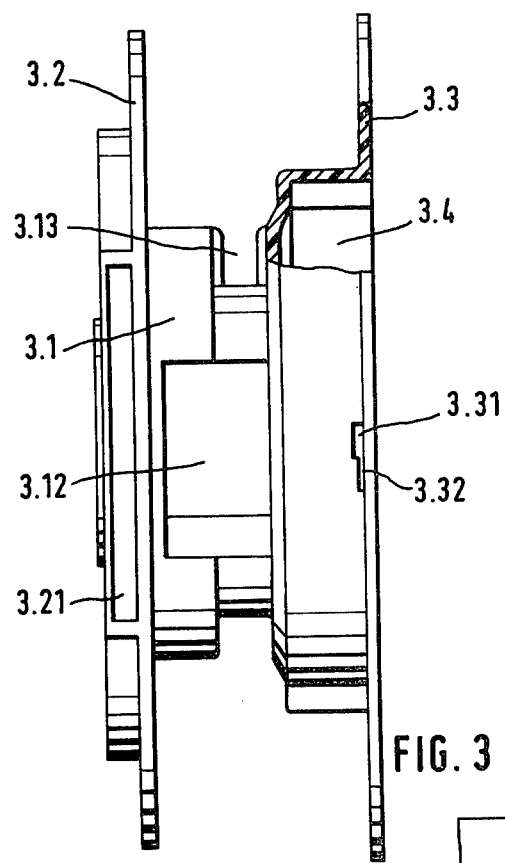
FIG. 3
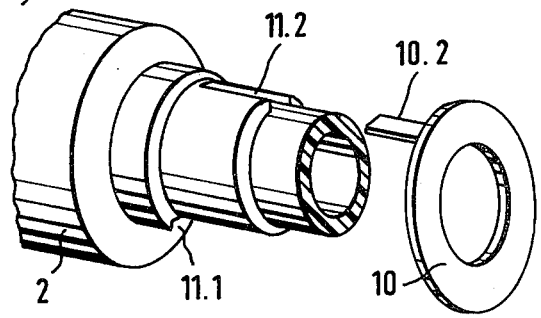
FIG. 6
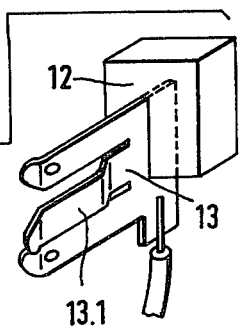

DEVICE FOR AUTOMATICALLY WINDING UP A FEEDER CABLE

The invention relates to an apparatus for automatically winding up an electrical cable for an electrically operable apparatus on a drum by means of a coil spring stressed with the unwinding of the cable. The drum is journalled with its hollow hub in two sleeve bearings of different diameter formed with a pivot spindle fixed on a base plate. Between the bearings, two sliding contact elements comprised of contact rings and contact springs are arranged of which the contact rings are arranged non-rotatably on the pivot spindle and the contact springs are arranged in a contact carrier insertable in a recess in the hub. These types of winding up devices (cable drums) are particularly used with electrical apparatus of all types for the household, for example, vacuum cleaners, kitchen applicances, and the like.

From the DE-AS No. 1,574,391, an installation in the base of a crushing mill is known, by which the cable drum assembled out of two parts, is journalled in two sleeve bearings of different diameter formed with a pivot pin fixed on a base plate of which the sleeve bearing of larger diameter lying above the base plate at the same time forms a thrust bearing. The bearing must accommodate the drum and the cable weight and the contact pressure of two sliding contact elements, the contact rings of which are arranged outside of the drum concentrically on a drum flange. The carrier of the contact springs is a separate intermediate base centered on the pivot pin. The coil spring is arranged inside of the hollow drum hub. The connection cable is led in the hub hollow space and to a screw lock and in the insertion is clamped through pinching between saw teeth formed ribbed walls in pulling relief.

This arrangement is extraordinarily labor intensive as the drum can only be assembled when the leads of the cable are connected in the hub hollow space and the coil spring is installed. As accessories for electrical apparatus in daily use, however, such convenience serving windup devices must be as inexpensive as possible but nevertheless must have the same service life as the apparatus itself. This necessitates a configuration and an assembly technique of as simple as possible construction.

Thus, an apparatus of the above named type has been known from the DE-OS No. 2,756,023, which these conditions should fulfill. In this apparatus, the sliding contact elements are arranged in the hollow drum hub and, also, the outer contact springs are arranged on a contact carrier tangentially slidable in the hub. The coil spring is arranged as a roll band spring on a hub extension outside of the drum in a hollow pocket-like space formed centrally of the base plate. It is coupled with the hub extension through a snap connection that is difficult to access. The drum is protected against axial drawing off of the pivot pin through a rachet wheel, that is pushed on the free end of a trunnion penetrating the hollow pivot pin. The cable, introduced in a channel-formed recess of the hub, is secured against tension by a pinching member screwed laterally on the drum flange. Its leads are, by screw means, connected in the contact springs of the contact elements. One appreciates that the assembly cost is proportionately high.

A further disadvantage is the single sided tangential arrangement of the contact springs, through which the sleeve bearings are loaded with the contact pressure that damagingly increases the friction resistance.

The object of the invention is to so constructively form a windup apparatus of the initially named type that it can be formed out of few parts and these parts can be assembled in the fabrication by means of plug and locking connections through simple sliding movements in the axial and radial directions without the use of tools such as pliers or screwdrivers.

This object is achieved through a construction with the features of claim 1. Refinements of the construction embodiment are the object of the dependent claims.

The particular features result from a fabrication that is simple and feasible with unskilled labor and without tools and in an automated manner:

The contact rings are inserted on the middle part of the pivot spindle in and with its connection lugs in each of two slits in the wall of the spindle, thereby to receive the prescribed axial distance to each other and its connection lugs are here freely accessible, with subsequent connection of the apparatus side cables, from the backside of the base plate;

thereafter, the drum is pushed on the pivot spindle, until the collar of its hub locks behind the locking pawls formed in the base plate;

next, the coil spring or the spring housing is fitted on the solid end of the pivot spindle, in the course of which, through slight rotation, the spring ends are threaded in the corresponding slits; with use of a spring housing this is connected with radially extending tangs connected in a ring-type joint with the drum;

finally, from the side, the contact carrier is inserted in the recess in the wall of the hollow hub radially until it locks in, so that the contact springs embracingly slide on both sides of the associated contact rings;

the connectors of the cables belonging to the drum can be slipped on the connection lugs of the contact springs with flat plugs, if these have not already previously been connected with these lugs, and the cable end is pressed in a channel in the middle part of the hub, in which it automatically is held in pulling relief.

In the instance in which the drum is furnished with a centrifugal brake, the centrifugal weights are installed before the pushing on of the drum on the pivot spindle in the pockets previously provided therefor on the inner drum flange.

Figure 2:
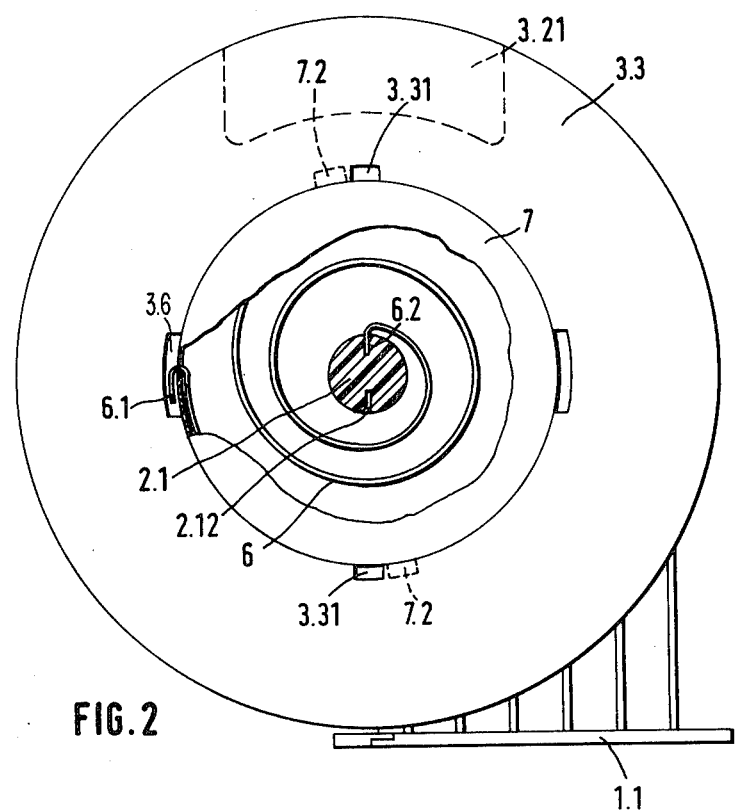
Figures 8, 8A:
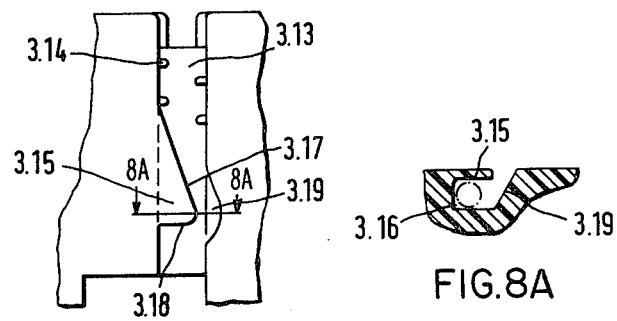
Figure 4:
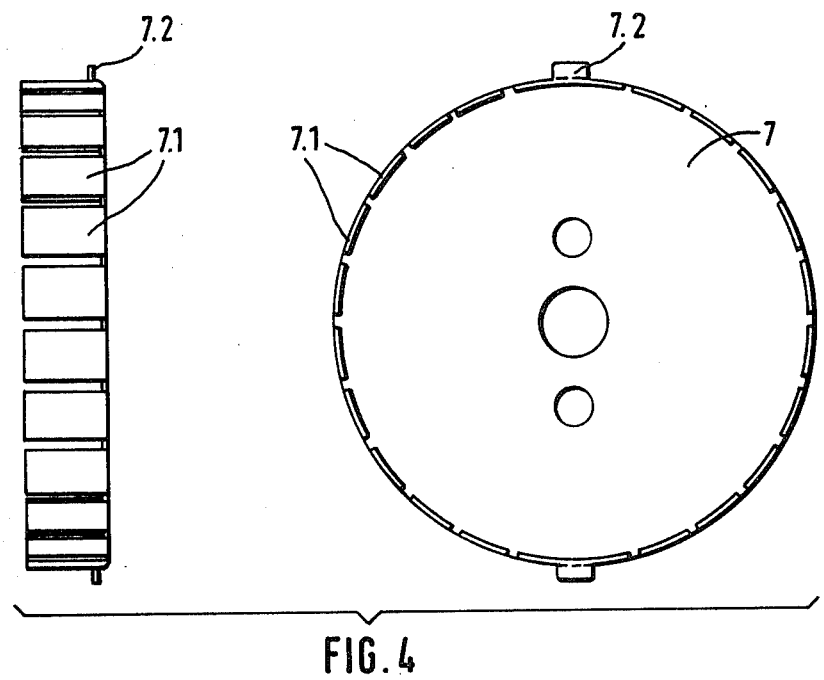
Figure 7:
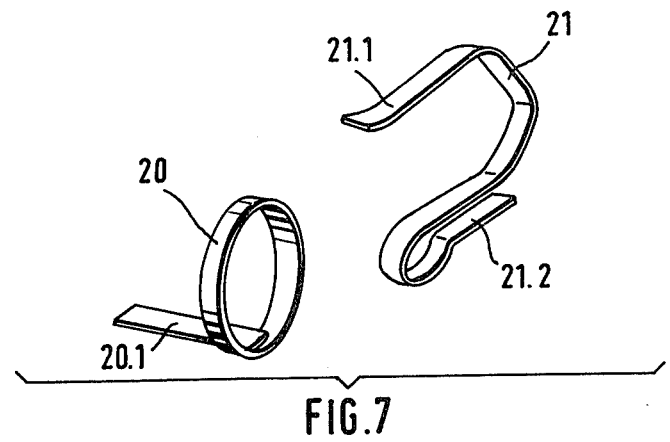
Figure 9:
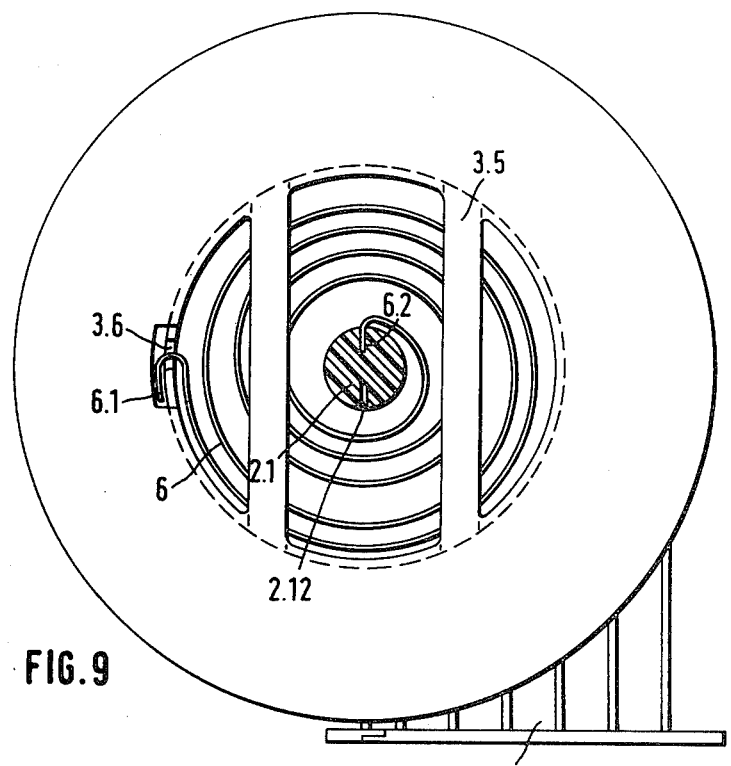
Figure 10:
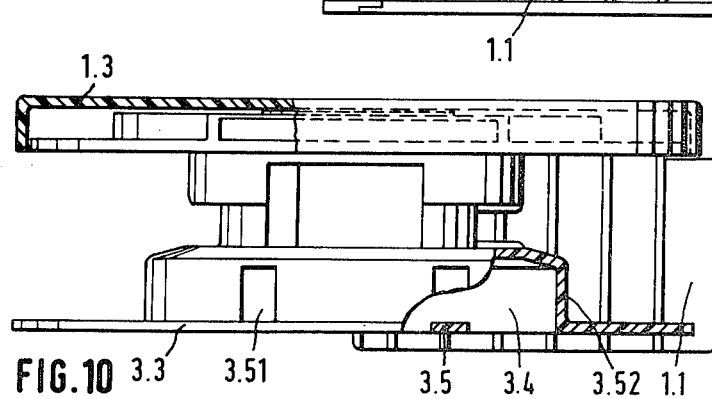

The invention is further described below in an exemplary embodiment and several modifications. The drawings show:

FIG. 1 a longitudinal section through the device after the assembly of its parts;

FIG. 2 a partially broken away, side view from the right in the direction of the arrow A in FIG. 1;

FIG. 3 a partially broken away, plan view of the drum in the direction of the arrow B in FIG. 1;

FIG. 4 a plan view and a side view of the spring housing in FIG. 1;

FIG. 5 a fragmentary portion of FIG. 1;

FIG. 6 a view of one of the two sliding contact elements employed in FIG. 1;

FIG. 7 a view of another embodiment of a sliding contact element with U-formed contact spring;

FIG. 8 a detail of the cable holder with pulling relief;

FIG. 8A a fragmentary cross sectional view taken along the line 8A—8A of FIG. 8;

FIG. 9 a side view corresponding to FIG. 2 of another embodiment of the drum; and FIG. 10 a partially broken away, plan view of FIG. 9 corresponding to FIG. 3.

According to FIGS. 1 and 2, a base plate 1 provided with a foot 1.1 has a pivot spindle 2 repeatedly reduced in diameter formed for a unitary drum 3, comprising a hollow hub 3.1 with an inner flange 3.2 and an outer flange 3.3. The pivot spindle 2 forms, with the hub 3.1, two sleeve bearings 4 and 5 of different diameter. In this region the pivot spindle is hollow; the part 2.1 extending beyond the outer sleeve bearing 5 is solid, and two slits 2.12 are molded in it (FIG. 2). The drum 3 forms in this region a hollow space 3.4 with a central cavity, that contains the spiral formed coil spring 6 or spring housing 7 flush with the outer surface of the outer flange 3.3. The hollow hub 3.1 has on its opening a ring formed collar 3.11 engaged behind the plurality of, for example six, locking pawls 1.2, symmetrically dividing the perimeter formed on the base plate 1, so that the drum 3 cannot be drawn off from the pivot spindle 2 in the axial direction.

On inner flange 3.2 of drum 3, two pockets 3.21 are formed (FIG. 2), in which centrifugal weights 8 loosely rest. The base plate 1 forms, with its edge, a ring formed braking surface 1.3.

FIG. 4 shows the spring housing 7, whose side wall is formed out of comb-like standing teeth 7.1. Additionally, two lugs 7.2 on a diameter are bent radially outwardly. The coil spring 6 is hooked on its outer end with a hook 6.1 in one of the slits between the teeth 7.1 (FIG. 2) and on its inner end with a hook 6.2 in one of the slits 2.12 of the pivot spindle point 2.1. The spring housing 7 can be formed as a deep drawn flat plate with only one slit in the side wall.

Two perforations 3.31 are placed in the outer flange 3.3 of the drum 3 on the edge of the central cavity (FIG. 2), through which, with the installation of the spring housing 7, its lugs 7.2 can be brought behind the flange and can be inserted in a connecting slit 3.32, so that the spring housing is held in the drum in the manner of a bayonet connection.

FIG. 3 shows the configuration and arrangement of the perforation 3.31 and slits 3.32, one of the pockets 3.21 for the centrifugal weight 8 and in the middle part of the hollow hub 3.1 the recess 3.12, through which the contact carrier 12 for the contact springs, (see below) is radially inserted, as well as the channel 3.13, in which the end of the cable 9 to be wound up on the drum 3 is secured.

For a better understanding, the sliding contact element, its contact carrier, and the middle hub part with the slip rings are further shown in FIG. 5 (compare also FIG. 6). Two annularly formed contact rings 10 are inserted with different length connection lugs 10.1, 10.2 in different length longitudinal grooves 11.1, 11.2 of the middle portion of the pivot spindle 2. The connection lugs project through slit formed perforations into the hollow space of the spindle. The different length of the grooves determines the axial spacing of the contact rings 10. A contact carrier 12 carries two contact springs 13, which each form three prongs, of which the middle prong, 13.1 is bent out of the plane of the other two about the thickness of the contact ring 10 (FIG. 6). As the contact prongs lie on both surfaces of the contact ring 10, they mutually neutralize each other in their action and there appears on the sleeve bearing 4 (FIG. 1), that is at the same time a thrust bearing, no axial reaction forces. One can appreciate from FIG. 1 moreover, that the inside diameter of the hub 3.1 is so proportioned that the contact rings 10 can slide freely over the hub.

In FIG. 7 another exemplary embodiment of the sliding contact element is shown, in which the contact rings 20 are narrow cylinder rings and the contact springs 21 are bent in a U-form. Also here the contact forces of the two spring legs 21.1, 21.2 resting diametrically on the contact rings 20 cancel out, and there developes no reaction forces on the two sleeve bearings 4, 5. The leg 21.2 serves simultaneously as connection lug for a connector of the connecting cable 9.

FIGS. 8 and 8A show in an enlarged scale and in a flattened form, the configuration of the channel 3.13 in which the cable 9 is secured. Oppositely standing ribs 3.14 on the sidewalls strongly squeeze the cable in a known way against the axial pulling. The channel is at its outlet laterally expanded so that it forms a pocket 3.16 beneath an overlying tongue 3.15. This tongue is so formed that it possesses in the insertion direction of the cable (also winding direction) a flat bent inlet 3.17 for the better guiding insertion lead in of the cable. Further, the bevel 3.19 presses the conductor beneath the blocking tongue in the pocket 3.16. The forward tongue edge 3.18 parallel to the axis prevents, on the other hand, a peeling off of the cable out of the ring formed channel 3.13 with the unwinding of the cable.

FIGS. 9 and 10 show an accommodation of the coil spring 6, with which the hollow space 3.4 itself forms the spring housing. In the plane of the flange 3.3, two extending webs 3.5 form a barrier against an axial dislocation of the coil spring winding. These webs 3.5 lie in the mold release direction of the molds of the injection molding and are formed through four windows 3.51 in the windup collar 3.52 of the drum 3.

The coil spring 6 is supplied as a band in the extended condition, the ends are annealed and bent to hooks 6.1, 6.2. Initially, the hook 6.2 is introduced through the opening 3.6 radially through the hollow space 3.4 and hooked in one of the slits 2.12. The drum is now rotated a predetermined number of rotations so the coil spring 6 receives a corresponding number of coils whereby the hook 6.1 is engaged outwardly in the opening 3.6.

This embodiment brings an essential saving as the spring formed out of strip steel lies in price approximately 40% under a prefabricated coil spring and the spring housing is not needed.

A further possibility for economy occurs in that the contact carrier 12 of the drum 3 is formed so as to be part of the drum hub 3.1, so that the recess 3.12 is not necessary. The contact springs 13 are then radially inserted with the mounting in corresponding slits and thus held through a locking connection. A supposition in the use of plastic is that it tolerates a temperature load appearing through heating of the sliding contacts.

We claim:

1. Apparatus for automatically winding up an electrical cable on a drum by means of a coil spring stressed with the unwinding of the cable, said drum having a hallow hub, the drum being journalled with its hollow hub in two sleeve bearings of different diameters formed on a pivot spindle fixed on a base plate, two sliding contact elements comprised of contact rings and contact springs being arranged between said bearings, the contact rings of said elements being arranged non-rotatably on the pivot spindle and the contact springs being arranged on a contact carrier insertable in a recess of the hub, characterized through the features (a) an opening of the hollow drum hub (3.1) facing the base plate (1) is provided with a collar (3.11), (b) an outer drum flange (3.3) froms a central hollow space (3.4) for receiving a coil spring (6), (c) a middle part of the hub (3.1) contains said recess (3.12) for the contact carrier (12) for said contact springs (13,21) and a pull relief (13.13) for the electrical cable (9), (d) locking pawls (1.2) are formed in the base plate and engage the collar (3.11) of the hub (3.1) thereby to protect the drum (3) against axial drawing off from the pivot spindle (2), (e) the pivot spindle (2) is formed hollow in a hub area, is formed solid in an end area and is provided with at least one slit (2.12) in said solid end area, (f) the coil spring (6) is formed as a spiral spring with hook formed ends (6.1, 6.2) of which an inner hook end (6.2) is inserted in the slit (2.12) in the end area of the pivot spindle and an outer hook end (6.1) is inserted in an opening (3.6) on the wall of the hollow space (3.4), (g) the contact carrier (12) is mounted in the recess (3.12) of the hub (3.1) so that the contact springs (13,21) engage the contact rings (10,20), and, (h) the contact springs (13,21) engage opposing sides of the contact rings (10,20) so that contact pressures are applied only in the contact elements.

2. The apparatus according to claim 1 with a centrifugal brake comprising weights (8) engaging on a ring formed edge (1.3) of the base plate, characterized in that in an inner drum flange (3.2) turned toward the base plate (1), two diametrically oppositely lying pockets (3.21) are formed for installation of the centrifugal weights (8).

3. The apparatus according to claim 1 with a spring housing (7) for the coil spring, characterized in that in the spring housing (7) two diametrically oppositely lying radially projecting lugs (7.2) are formed, and on the edge of the hollow space (3.4) in the outer drum flange (3.3) two diametrically oppositely lying perforations (3.31) are formed, in which the lugs are held under the stress of a restoring force of the coil spring (6) in the manner of a bayonet lock connection.

4. The apparatus according to claim 1, characterized in that in the middle part of the hub (3.1), said pull relief comprises a ring-formed channel (3.13) of the diameter of the cable (9) is formed with sidewalls having alternately standing ribs (3.14), one of said side walls containing a pocket (3.19) opposite a tongue (3.15) extending from the other of said side walls, said cable lying beneath said tongue and between said ribs.

5. Apparatus according to claim 1 characterized in that the contact rings (20) are cylindrical rings fitted on the pivot spindle (2) and spacedly arranged next to each other, and the contact springs (21) and bent U-formed with legs (21.1, 21.2) contacting the contact rings on diametrically oppositely outer surfaces, one of said legs being formed as a connection lug for a cable lead.

6. The apparatus according to claim 1 characterized in that the contact rings are annular rings (10) fitted on the pivot spindle (2) and spacedly arranged next to each other and the contact springs (13) are formed in the manner of a comb with prongs (13.1) contacting the contact ring on both sides, the contact spring (13) further having a connection lug for a cable lead.

7. The apparatus according to claim 5 or 6 characterized in that the contact rings (10, 20) have second connection lugs (10.1, 10.2, 20.1) extending through grooves (11.1, 11.2) in the wall of the pivot spindle (2) in its hollow hub area, said second connection lugs having different lengths which determine the necessary axial spacing between the contact rings.

8. Apparatus according to claim 1 characterized in that the drum is injection molded as a single piece out of plastic.

9. Apparatus according to claim 1 characterized in that the hollow space (3.4) is spanned by at least one web (3.5) lying in the plane of the outer drum flange (3.3).

10. The apparatus according to claim 3 in which the spring housing (7) has a side wall formed out of comblike teeth (7.1), housing slits being defined by spaces between the teeth, said outer hook end (6.1) being inserted in a said housing slit.

* * * * *